March 31, 1953  C. A. KARG  2,633,184
FLEXIBLE EDGE SEAT
Filed Nov. 2, 1946

INVENTOR.
CHARLES A. KARG
BY
ATTORNEY

Patented Mar. 31, 1953

2,633,184

UNITED STATES PATENT OFFICE 2,633,184

FLEXIBLE EDGE SEAT

Charles A. Karg, Cuyahoga Falls, Ohio, assignor to Wingfoot Corporation, Akron, Ohio, a corporation of Delaware Application November 2, 1946, Serial No. 707,396

3 Claims. (Cl. 155—179)

This invention relates to seats, such as furniture, automobile, theater, and other seats, and, more particularly, is concerned with suspension type seats having flexible edge portions.

Over hundreds, and even thousands of years, various types of seats have been proposed and built. It is commonly believed to day that automobile seats, richly upholstered, deeply cushioned, lounge chairs, theater seats, and the like, have achieved a high degree of comfort. However, even chairs or seats possessing an alleged high degree of comfort and having relatively soft and deep cushions cannot be sat in for more than a few hours time without the user of the seat sliding down to sit on his spine, or the like, with high fatigue recation developing in many, many instances. Moreover, conventional chairs and seats, particularly with helical wire spring structures, are space consuming, heavy in weight, and relatively expensive.

It is the general object of the present invention to avoid and overcome the foregoing and other difficulties of and objections to prior known seat constructions by the provision of a relatively inexpensive, light-weight seat construction characterized by savings of space and possessing high comfort characteristics over long periods of use.

Another object of the invention is to provide a suspension type seat, for example, a seat incorporating the principles of a canvas lawn chair, and characterized by a flexible and resilient supporting edge.

The foregoing objects of the invention, and other objects which will become apparent as the description proceeds, are achieved by the provision of a seat including a flexible load carrying portion, a frame, means pivotally secured to the edge of the frame and extending outwardly at an angle therefrom, one portion of the means being free to move toward the frame but not away from the frame from its initial position, the means being positioned at laterally spaced points along the edge of the seat and being connected at their unpivoted ends to one edge of the flexible load carrying portion, the said edge of the flexible load carrying portion being flexibly connected between the pivotally mounted means, and means resiliently connecting the opposite edge of the load carrying portion to the frame.

Figure 1:
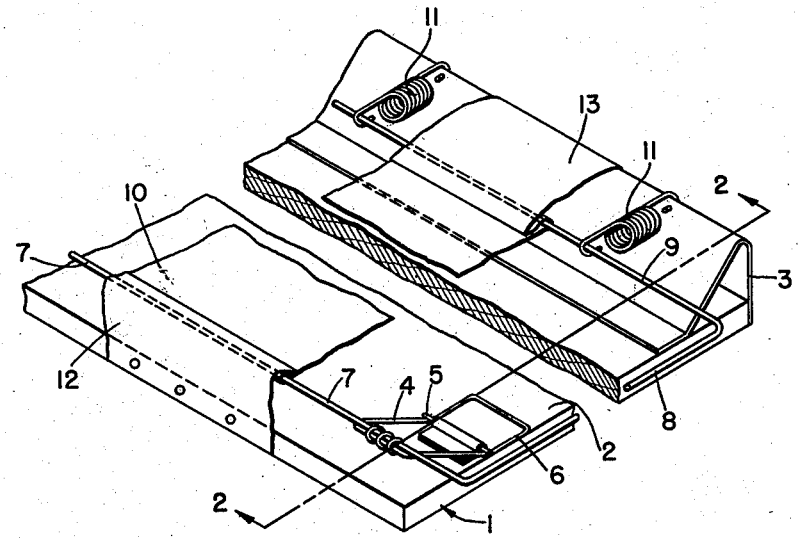
Figure 2:
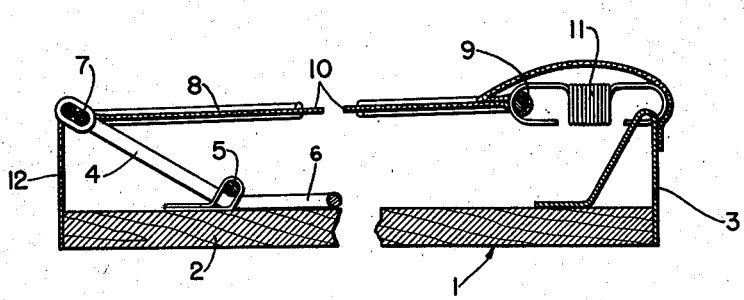

For a better understanding of the invention reference should be had to the accompanying drawing, wherein:

Fig. 1 is a perspective view of a seat incorporating the principles of the invention, a portion of the seat being broken away together with portions of the covering fabric; and Fig. 2 is a vertical cross-sectional view taken substantially on line 2—2 of Fig. 1, but on a somewhat larger scale.

In the drawings, the numeral 1 indicates generally a frame which obviously may take a plurality of forms, and which can be constructed from any of a variety of materials. The specific frame illustrated comprises a base portion 2 made of plywood or other material, and extending along the back of the base 2 is a beam 3 made of sheet metal and secured to the base 2 in any suitable fashion. It might be noted that the frame 1 illustrated and described is particularly adapted for experiment or for development, and that in production the frame 1 would probably take the form of side or end channels of wood or sheet metal having a beam extending along the front edge of the frame and a beam extending along the top of the rear of the frame and spaced from the floor or bottom of the frame as far as possible to allow clearance for feet, suit cases, or other means beneath the seat.

Mounted at spaced points along the frame 1 adjacent the edge thereof are a plurality of rotatably or pivotally mounted bell-crank levers 4, which may be made of sheet metal, castings, extrusions, wood, or other suitable means, and which are rotatably or pivotally fastened to the base 2 of the frame, for example, by a hinge 5. In the embodiment of the invention illustrated the pivotally mounted means 4 takes the form of a rod or heavy wire bent into a U-shape, and having a portion 6 extending beyond the hinge 5 so that the pivotally mounted means 4 can move down towards the base 2 about the hinge 5, but without being able to move farther away from the base 2 than its initial position.

The pivotally mounted means or bell-crank levers 4 are positioned, as previously indicated, at laterally spaced points along the front of the base 2. For example, in a chair of a width adapted to seat only a single person, only two of the means 4 may be employed, one at each side and front of the chair. Or, again, three of the means 4 may be used, one at each side of the front and one in the center of the front, or, still again, four of the means 4 may be positioned at spaced points along the front edge of the chair. In a davenport or other seat construction adapted to seat more than one person correspondingly spaced members of the means 4 may be used, a greater number being required because of the greater width of the seat. The means 4 are at least spaced apart the width of a means 4.

In any event, the pivoted means or levers 4 are secured together at their upper and outer, that is their unpivoted ends, by flexible means such as a resilient wire 7. The wire 7 may be extended on around the ends of the seat, as at 8, and along the back of the seat, as at 9, to provide a resilient frame work or edge which serves to support a flexible load-carrying portion 10 of the seat. The flexible or resilient means, such as the wire 7, connecting the movable ends of the pivoted means or bell-crank levers 4 are sufficiently strong to support the load-carrying portion 10 between the levers 4, but are sufficiently flexible to permit independent movement of the levers 4. Suitable tie or clamp means, such as clamp rings 7a, may be used to secure the wire 7 to the upper front end of the means 4, which clamp rings 7a may be considered to be part of the means 4.

The flexible load carrying portion of the seat may take a variety of forms, comprising flexible wire netting, flexible wires, flexible sheet metal, glass fabric, or the like, but one relatively inexpensive and ordinarily satisfactory material is high strength canvas, with the canvas being wrapped around the flexible wires 7, 8 and 9 at the front, sides and back of the seat, respectively, and sewn in place. The back edge of the flexible load-carrying portion 10 is secured to the beam 3 by resilient means, for example, tension springs 11 which connect over the wire 9 at one end and are received in suitable holes in the beam at their other. It will be understood that the springs 11 apply a tension to the load carrying portion 10, such tension being of any selected amount for a given seat construction. Any desired pre-loading can thus be given to the seat. The tension of the springs 11 will normally pull the pivoted means or levers 4 upwardly to bring the extensions 6 into engagement with the base 2, or, if desired, the upward movement of the pivoted means or levers 4 may be limited by canvas or other flexible means 12 secured to the front of the base 2 and to the flexible wire or edge means 7.

In order to finish up the load carrying surface of the seat the canvas forming the load carrying portion 10 may be provided with a flap 13 at its rear edge, the flap being folded back over the springs 11 and fastened to the beam 3, sufficient looseness being provided in the flap 13 to allow for the expansion and contraction of the springs 11.

The rotatably or pivotally mounted means 4 make such an angle with the load carrying portion that when a load is applied to the portion the means 4 will swing to apply a greater tension on the springs 11 to thereby better adapt the portion to support a load. Moreover, the means 4 provide a deeply soft and flexible front or other edge on the seat. Preferably, the angle between the means 4 and the load-carrying portion or surface is between about sixty and about thirty degrees.

From the foregoing it will be recognized that the various objects of the invention have been achieved by the provision of a relatively inexpensive, easily constructed, light-weight, suspension type seat construction having space saving characteristics and characterized by high comfort over long periods of time. The high comfort characteristics are believed to result from the fact that the load carrying portion 10 is like a hammock or a canvas lawn chair in providing substantially uniform pressure gradient between the supporting surface of the seat and the body of the user of the seat, and with flexible front edges of the seat preventing cutting of the thighs or under the knees of the user.

The seat construction herein illustrated and described is particularly adapted to be used as a seat bottom, but it will be recognized that the principles thereof may be readily incorporated into a seat back. The seat of the present invention can be finished in any of the usual or conventional ways, for example, by the addition of sisal, rubberized hair, cellular rubber, cotton, or other padding and upholstering, or, the seat of the present invention may have the load carrying portion 10 formed of striped, colored, or other attractive materials, and without the use of any adidtional padding or upholstering the resultant seat is attractive and comfortable.

While in accord with the patent statutes, one embodiment of the invention has been illustrated and described in detail, it is to be particularly understood that the invention is not to be limited thereto or thereby, but that the scope of the invention is defined in the appended claims.

What is claimed is:

1. In combination in a seat, a frame, a flexible load carrying member, resilient means connecting one edge of said member to said frame, a bell crank lever one arm of which is secured to an opposite edge of said member and the other arm of which is adapted to bear upon the frame to limit the no load position of the lever, said one arm being free for downward arcuate movement upon load application to said member, and hinge means securing said lever to said frame beneath said member.

2. In combination in a seat, a frame, a flexible load-carrying member, a plurality of laterally-spaced, bell-crank levers rotatably mounted adjacent the front edge of the frame, each bell-crank lever having an upwardly and forwardly extending arm secured to a front edge of the load-carrying member, flexible means connecting the forwardly and upwardly extending arms of the bell-crank levers together, resilient means connecting the back edge of the load-carrying member to the frame, each of the bell-crank levers having a rearwardly extending arm normally engaging the frame to limit upward movement from its initial position of the forwardly and upwardly extending arm of each bell-crank lever.

3. A seat including a flexible load-carrying portion, a frame, means pivotally secured to the frame at a fixed point adjacent the front edge thereof, said means including a first portion extending upwardly from the frame and outwardly of the seat, said first portion being free to move downwardly and upwardly, said means also including a second portion which limits upward movement of said first portion from its initial position, means flexibly connecting the upper end of said first portion to the front edge of the load-carrying portion, and means resiliently connecting the rear edge of the load-carrying portion to the frame.

CHARLES A. KARG.

REFERENCES CITED

The following references are of record in the file of this patent:

UNITED STATES PATENTS

| Number | Name | Date |
|---|---|---|
| 210,989 | Bunnell | Dec. 17, 1878 |
| 1,975,586 | Law | Oct. 2, 1934 |
| 2,106,066 | Sadgrove | Jan. 18, 1938 |
| 2,109,282 | Bernstein | Feb. 22, 1938 |
| 2,133,747 | Hunter | Oct. 18, 1938 |
| 2,145,408 | Taylor | Jan. 31, 1939 |
| 2,177,175 | Freund | Oct. 24, 1939 |
| 2,182,253 | Farrell | Dec. 5, 1939 |
| 2,207,054 | Freund | July 9, 1940 |
| 2,280,912 | Hopkes | Apr. 28, 1942 |